3,752,837
ANTIMONY AMINOALKOXIDE

Hiroshi Okuto, Toyonaka, and Kiyoshi Yasuda, Ikeda, Japan, assignors to Takeda Chemical Industries, Ltd., Osaka, Japan
No Drawing. Filed May 17, 1971, Ser. No. 144,319
Claims priority, application Japan, May 18, 1970, 45/42,286; Dec. 25, 1970, 45/129,651
Int. Cl. C07f 9/90
U.S. Cl. 260—446  3 Claims

ABSTRACT OF THE DISCLOSURE

Novel antimony aminoalkoxides which are prepared by allowing antimony trioxide to react with aminoalcohol, and the antimony aminoalkoxides are usable as fire retardants.

---

Antimony aminoalkoxide

This invention relates to a novel antimony aminoalkoxide which is useful, for example, as a fire retardant for resin, fiber, etc.

As a typical example of antimony-containing fire retardants, antimony trioxide has been well known. However, since antimony trioxide is insoluble in water and an organic solvent applicable to substrate e.g. resin or fiber, it is difficult to allow antimony trioxide to coat the substrate homogeneously or disperse into the substrate evenly in a fine particle state.

Antimony trichloride has been known as being of better solubility than antimony trioxide. However, since antimony trichloride, when reacted with water in the air, produces a relatively large volume of hydrogen chloride which inevitably deteriorates the substrate, antimony trichloride is also undesirable as a fire retardant.

It may be proposed to use antimony alkoxide as a fire retardant. However, since the antimony alkoxide is extremely unstable in the air, it cannot be practically used as a fire retardant.

In view of the state of the art mentioned above, the present inventors have made extensive studies for finding out an antimony-containing fire retardant which is effectively usable as a practical fire retardant without any of the defects in the known ones as mentioned above. And the studies revealed the following findings:

(1) An aminoalcohol reacts unexpectedly with an antimony trioxide to give antimony aminoalkoxide;

(2) The antimony aminoalkoxide not only retains a fire retardant effect similar to that of the known antimony alkoxide but also is remarkably more stable than the known antimony alkoxides;

(3) The antimony aminoalkoxide can be easily dissolved in various solvents; and (4) The antimony aminoalkoxide can be hydrolyzed into antimony trioxide under certain conditions.

On the basis of the above findings, the present inventors have made further extensive studies and accomplished the present invention.

The principal object of the present invention is to provide a novel antimony aminoalkoxide which is effectively usable as a fire retardant.

Another object of this invention is to provide a novel process for production of the antimony aminoalkoxide.

The antimony aminoalkoxide of the present invention can be produced by allowing antimony trioxide to react with an aminoalcohol.

The aminoalcohol employable in the present process can be shown by the following General Formula I or II.

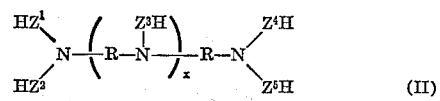

In the above General Formulas I and II, $Z^1$, $Z^2$, $Z^3$, $Z^4$ and $Z^5$ are the same with or different from one another and each represents a straight-chained alkyleneoxy group having up to 4 carbon atoms, which may have a branch methyl, ethyl, chloromethyl, allyloxy, phenyl or tolyl group. R means bivalent hydrocarbon having up to 14 carbons, and X means an integer from 0 to 7 inclusive.

The straight-chained alkyleneoxy group represented by $Z^1$, $Z^2$, $Z^3$, $Z^4$, and $Z^5$ may, for example, be $$-CH_2-CH_2-O-, \quad -CH_2CH_2CH_2-O-$$

and $$-CH_2CH_2CH_2CH_2-O-.$$

Those alkyleneoxy groups may have methyl, ethyl, chloromethyl, allyloxy, phenyl or tolyl group as a branch. The bivalent hydrocarbon having up to 14 carbons representd by R may, for example, be alkylene which may have arylene as its intermediate group and arylene which may have alkylene as its intermediate group. Specific examples of R may be

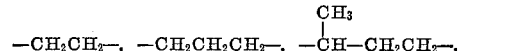

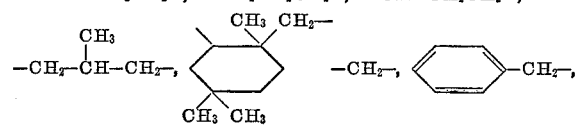

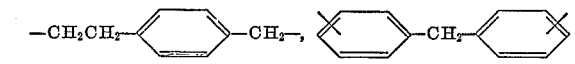

and

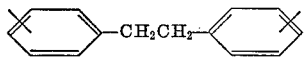

The aminoalcohol of the General Formula I may, for example, be triethanolamine and tri-isopropanolamine.

The aminoalcohol of the General Formula II may, for example, be N,N,N',N'-tetrakis(isopropanol) ethylenediamine, a reaction product of diethylenetriamine with propylene oxide in a molar ratio of 1:5, a reaction product of hexaethyleneheptamine with allylglycidyl ether in a molar ratio of 1:9, a reaction product of tolylenediamine with butylene oxide in a molar ratio of 1:4, a reaction product of 4,4'-diphenylmethanediamine with epichlorohydrin in a molar ratio of 1:4 and a reaction product of ω,ω'-dimethylbenzenediamine with styrene oxide.

According to the process of the present invention antimony trioxide is allowed to react with an aminoalcohol of the General Formula I or II.

A preferable amount of the aminoalcohol employable in the process is selected so that the number of alcoholic hydroxyl group in the aminoalcohol may be about 3 to about 100 per antimony atom of the other reactant.

The present reaction is conducted in the absence or the presence of a suitable solvent preferably by evaporating off water produced during the reaction, for instance, by introducing inert gas, (e.g. $CO_2$, $N_2$, He) or by conducting the reaction under reduced pressure or by azeotropically distilling water together with the solvent used in the reaction.

The solvent employable in the reaction may be preferably one having a boiling point of not lower than about 100° C. and such is exemplified by toluene, xylene and butyl acetate. The aminoalcohol employable in the reaction may be used as a solvent.

The antimony aminoalkoxide produced as above can be easily separated from the reaction mixture by a per se conventional purification means, for instance, by extracting the reaction mixture with a suitable solvent such as isopropanol and toluene and evaporating the solvent.

The antimony aminoalkoxide of the present invention is a novel product and is represented by the following General Formula III or IV.

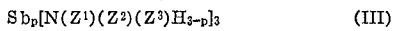

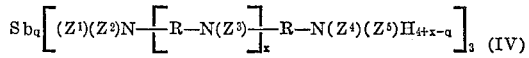

In the Formula III or IV, an average value of $p$ or $q$ is a whole number greater than 0 but lower than 3 (i.e. $0<\bar{p}$ or $\bar{q}<3$).

Generally the present antimony aminoalkoxide consists of a mixture of various antimony aminoalkoxides include in the genreal Formula III or IV wherein $p$ or $q$ varies with the range of $\bar{p}$ or $\bar{q}$ defined above.

Content of antimony of the present antimony aminoalkoxide lies preferably in the range of about 1% to about 45% by weight.

The antimony aminoalkoxide of the present invention is much more stable than the known antimony alkoxide and retains the strong fire retardant effect and, therefore it is more useful as a fire retardant.

It is also noted that the present antimony aminoalkoxide is easily soluble in an aqueous or non-aqueous solvent, unlike the insolubility of the known antimony trioxide. Therefore, the present antimony aminoalkoxide has its specific application as a fire retardant.

The present inventors found that the antimony aminoalkoxide of the present invention can be hydrolyzed under heating or the presence of an acid catalyst into antimony-oxy compound and an aminoalcohol.

The heating temperature for the hydrolysis is generally not lower than about 50° C. and preferably from about 70° C. to about 200° C.

The acid catalyst may, for example, be an organic acid such as acetic acid, propionic acid, benzoic acid and p-toluenesulfonic acid and an inorganic acid such as hydrochloric acid, sulfuric acid and nitric acid.

When those acid catalysts are employed, the hydrolysis can be conducted generally at a temperature not lower than about −20° C. and practically at room temperature.

An amount of the acid employable in the hydrolysis is not critical and preferably about 0.1 to 10 moles per an antimony atom of the antimony aminoalkoxide.

The antimony-oxy compound produced by the hydrolysis includes mainly antimony trioxide, antimony hydroxide and a partial hydrolyzate of antimony aminoalkoxide (e.g. antimony-oxy aminoalkoxide and hydroxyantimony aminoalkoxide).

Although production ratio of the various antimony-oxy compounds varies with a reaction temperature and time, a kind or an amount of the acid catalyst, etc., production of antimony trioxide tends to predominate when conditions for hydrolysis becomes drastic. Therefore, by controlling suitably the conditions for hydrolysis, the antimony aminoalkoxide of the present invention can be hydrolyzed substantially into antimony trioxide and an aminoalcohol. And the aminoalcohol produced by the hydrolysis can be easily removed and separated from the other resulting antimony trioxide by washing with a solvent which can dissolve the aminoalcohol (e.g. toluene, xylene, butyl acetate and water).

The hydrolysis of the present antimony aminoalkoxide makes it possible to fix homogeneously antimony trioxide on or in a substrate (e.g. fiber and resin), which has heretofore been difficult due to the insolubility of antimony trioxide itself. Thus, the antimony aminoalkoxide of the present invention is dissolved in a solvent such as an alcohol (e.g. methanol, ethanol and isopropanol), a hydrocarbon (e.g. benzene, toluene, xylene, hexane and petroleum ether), an ester (e.g. ethyl acetate), a ketone (e.g. acetone and methyl ethyl ketone), an ether (e.g. tetrahydrofuran), water and a suitable mixture of them. The solution of the antimony aminoalkoxide prepared above is applied to the substrate by, for example, coating, spraying, dipping, whereby a uniform coat or a homogeneous disperse of the antimony aminoalkoxide is attained. Then the antimony aminoalkoxide fixed to the substrate is hydrolyzed under the conditions mentioned before, for example, by being dipped into an aqueous solution of acetic acid, substantially into antimony trioxide and an aminoalcohol, the latter being removed simultaneously upon washing, while the former being fixed to the substrate.

The substrate treated above shows a remarkable fire retardant effect, which may be synergistically increased when a halogenated compound coexists.

The halogenated compounds may be any one which has been known to be effective as a fire retardant or as its additive and those compounds may, for example, be a halogenated aliphatic hydrocarbon (e.g. tetrachloroethylene, hexachlorobutadiene, chlorinated paraffin, polyvinyl chloride, polyvinylidene chloride, tetrabromoethane and tetrabromobutadiene), a halogenated aromatic hydrocarbon (e.g. hexachlorobenzene, chlorinated diphenyl such as decachlorodiphenyl, hexabromobenzene, bromodiphenyl such as decarbomodiphenyl) a halogenated dicarboxylic acid (e.g. chlorendic acid, tetrachlorophthalic acid and tetrabromophthalic acid), a halogenated phenol compound (e.g. tetrachlorobisphenol A and tetrabromobisphenol A), a halogenated diester (e.g. diallyl tetrachlorophthalate), a halogenated diol (e.g. 2,2-di (4-hydroxyethoxy-3,5-dibromophenyl) propane), a halogen-containing phosphoric acid ester (e.g. tris (2-chloroethyl) phosphate, tris (2,3-dichloropropyl) phosphate, tris (2-bromo-3-chloropropyl) phosphate and tris (2,3-dibromopropyl)phosphate and an amide, ester and urethane corresponding to the above mentioned halogenated carboxylic acids, phenols and esters.

An amount of the halogenated compound employed is generally not less than about 0.01 and preferably about 0.1 per antimony atom. Although the upper limit of the amount of the halogenated compound is not critical, the limit is practically about 100 halogen atoms per antimony atom.

The substrate to which the present antimony aminoalkoxide is applicable may be anyone requiring fire retardant property and such may, for example, be resin (polyester, polyurethan), fiber (cotton, flax, silk, wool, polyethylene, polypropylene, polyamide, polyester, polyacrylonitrile, polyvinylalcohol, polyvinylchloride and polyurethan) and wool.

EXAMPLE 1

Under 30 mmg. Hg at 170° C., 14.6 grams of antimony trioxide containing 0.1 mole of antimony is allowed to react with 44.7 grams (0.3 mole) of triethanolamine with stirring for 6 hours, whereupon 2.7 grams of water is evaporated and most part of the antimony trioxide is completely dissolved and the objective antimonyaminoalkoxide is produced in the solution as pale yellowish liquid.

*Elementary analysis.*—Calculated for $SbC_{18}H_{42}N_3O_9$ (percent): Sb, 21.5; C, 38.2; H, 7.4; N, 7.4. Found (percent): Sb, 21.8; C, 38.5, H, 7.8; N, 7.1.

The product shows the following signals in NMR specturm (60 mc.) in deuterated dimethyl sulfoxide.

7.4 p.p.m. (triplet)—18H assigned to N—C$\underline{H}_2$—
6.6 p.p.m. (triplet)—12H assigned to —C$\underline{H}_2$—OH
5.7 p.p.m. (broad)—6H assigned to —C$\underline{H}_2$—OSb
6.2 p.p.m. (singlet)—6H assigned to —CH$_2$O$\underline{H}$ The product shows its specific absorption at 560 cm.$^{-1}$ and 500 cm.$^{-1}$ in an infrared absorption spectrum by liquid film method.

The product is easily soluble in water and also soluble in ethanol, pyridine and dimethylsulfoxide.

The product remains unchanged when left standing in the air for 3 days.

On the other hand, the known antimony triethoxide is hydrolyzed into white turbid solid within a minute on exposure to the air.

EXAMPLE 2

Under the pressure of 30 mm. Hg at 180° C.–200° C. 48.6 grams of antimony trioxide is allowed to react with 191 grams of tri-isopropanolamine under stirring for 10 hours, followed by extraction with 1 liter of isopropanol. Evaporation of the isopropanol yields 215 grams of antimony aminoalkoxide as pale yellow and viscous liquid.

Elementary analysis.—Calculated for SbC$_{27}$H$_{60}$N$_3$O$_9$ (percent): Sb, 17.6; C, 46.9; H, 8.7; N, 6.1. Found (percent): Sb, 17.8; C, 46.5; H, 9.0; N, 6.0.

The product is soluble in water, ethanol, chloroform and toluene.

The product remains unchanged when left standing in the air for a week.

EXAMPLE 3

In a reactor 268 grams of antimony trioxide is allowed to react with 805 grams of N,N,N',N'-tetrakis(isopropanol)ethylenediamine at 180° C. for 10 hours in nitrogen stream introduced at the rate of 1.5 liter per minute, followed by extraction with 4 liters of isopropanol. Evaporation of the isopropanol yields 902 grams of antimony aminoalkoxide as pale yellow substance which can be solidified at room temperature.

Elementary analysis.—Calcd. for Sb$_{1.57}$C$_{42}$H$_{91.29}$N$_6$O$_{12}$ (percent): Sb, 18.0. Found (percent): Sb, 18.0.

The product is soluble in water, chloroform and acetone.

The product remains unchanged when left standing in the air for a week.

EXAMPLE 4

In the stream of nitrogen gas which is supplied at the rate of 1 liter per minute, 277 grams of antimony trioxide is allowed to react with 556 grams of N,N,N',N'-tetrakis-(isopropanol)ethylenediamine at 100° C. for 12 hours. The reaction mixture is extracted with 2 liters of isopropanol. Evaporation of the solvent gives 680 grams of antimony aminoalkoxide as pale yellowish solid.

Elementary analysis.—Calculated for Sb$_2$C$_{42}$H$_{90}$N$_6$O$_{12}$ (percent): Sb, 21.9; C, 45.3; H, 8.1; N, 7.5. Found (percent): Sb, 22.3; C, 44.9; H, 8.4; N, 7.5.

The product shows the following signals in NMR spectrum (100 mc.) in CDCl$_3$.

36H assigned to N—C$\underline{H}_3$ (p.pm.):
  8.94
  8.87
  8.80
36H assigned to N—C$\underline{H}_2$ (p.p.m.):
  7.85
  7.76
  7.64
  7.59
  7.53
  7.41
  7.32
  7.17
  7.08
18H assigned to —C$\underline{H}$—O and —O$\underline{H}$ (p.p.m.):
  near 6.15

The antimony aminoalkoxide obtained as above remains unchanged when left standing for 1 week.

On the other hand, the known antimony triisopropoxide is immediately hydrolyzed when left standing for only one minute, into white turbid substance which is not soluble in water or an organic solvent.

EXAMPLE 5

In the stream of nitrogen gas which is supplied at the rate of 1.5 liter per minute, 544 grams of antimony trioxide is allowed to react with 713 grams of triisopropanolamine at 200° C. for 12 hours. The reaction mixture is extracted with 4 liters of isopropanol. Evaporation of the solvent gives 980 grams of antimony aminoalkoxide as pale brownish solid.

Elementary analysis.—Calculated for Sb$_2$C$_{27}$H$_{57}$N$_3$O$_3$ (percent): Sb, 30.0; C, 40.0; H, 7.0; N, 5.2. Found (percent): Sb, 30.9; C, 39.5; H, 7.4; N, 5.1.

The product shows the following signals in NMR spectrum (100 mc.) in CDCl$_3$.

27H assigned to C$\underline{H}_3$ (p.p.m.):
  8.94
  8.84
  8.78
8H assigned to N—C$\underline{H}_2$ (p.p.m.):
  7.70
  7.60
  7.49
  7.30
12H assigned to C$\underline{H}$—O and —O$\underline{H}$ (p.p.m.):
  near 5.90

The product shows its specific absorption at 617 cm.$^{-1}$ in an infrared absorption spectrum by nujol method.

EXAMPLE 6

In nitrogen stream which is supplied at the rate of 1 liter per minute, 774 grams of antimony trioxide is allowed to react with 1950 grams of N,N,N',N'-tetrakis (isopropanol) ethylenediamine at 170° C. for 5 hours. The reaction mixture is extracted with 3 liters of isopropanol. Evaporation of the solvent gives 2130 grams of antimony aminoalkoxide as colorless and transparent viscous liquid.

Elementary analysis.—Calculated for

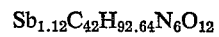

Sb$_{1.12}$C$_{42}$H$_{92.64}$N$_6$O$_{12}$ (percent): Sb, 13.5. Found (percent): Sb, 13.2.

The product shows its specific absorption at 615 cm.$^{-1}$ in an infrared absorption spectrum by liquid film method.

The product remains unchanged when being left in the air for a week.

The product is easily dissolved in water, ethanol, chloroform and acetone.

EXAMPLE 7

In the nitrogen stream which is introduced at the rate of 0.5 liter per minute, 73 grams of antimony trioxide is allowed to react with 180 grams of N,N,N',N'-tetrakis (butanol) propylenediamine at 160° C. for 5 hours. The resultant is extracted with 1 liter of methanol. Evaporation of the solvent gives 186 grams of antimony aminoalkoxide as pale brownish liquid containing 4.8% by weight of antimony.

Th product remains unchanged when being left in the air for 3 days.

The product is soluble in aceton and ethanol.

EXAMPLE 8

Under 40 mm. Hg at 170° C., 73 grams of antimony trioxide is allowed to react with 126 grams of tris (1-chloromethylethanol) amine with stirring for 5 hours, whereby 135 grams of antimony aminoalkoxide is obtained as pale brownish liquid containing 11.6% of antimony.

The product is soluble in acetone and ethanol.

The product remains unchanged when being left in the air for 3 days.

On the other hand, the known antimony tris (1-chloromethylethoxide) is hydrolyzed in only a minute into white turbid solid.

EXAMPLE 9

Under 20 mm. Hg at 170° C., 187 grams of an aminoalcohol of OH value 360, obtained by allowing $\omega,\omega'$-dimethylbenzenediamine to react with styrene oxide in the molar ratio of the former to the later being ¼, is allowed to react with 14.6 grams of antimony trioxide for 10 hours. The resultant is extracted with 1.5 liter of toluene. Evaporation of the solvent gives 191 grams of antimony aminoalkoxide as viscous liquid containing 5.1% of antimony.

EXAMPLE 10

Under 30 mm. Hg at 180° C., 260 grams of an aminoalcohol of OH value 390 which is obtained by allowing hexaethylene heptamine to react with allylglycidylether in the molar ratio of the former to the latter being ⅛ is allowed to react with 29.2 grams of antimony trioxide for 7 hours. The resultant is extracted with 1.5 liter of isopropanol. Evaporation of the solvent gives 280 grams of antimony aminoalkoxide as solid containing 8.2% by weight of antimony.

Hydrolysis of antimony aminoalkoxide

Reference 1.—In 500 milliliters of water is dissolved 19.5 grams of the antimony aminoalkoxide which is prepared in Example 1, whereby pH value of the solution becomes 10.2. To the solution is added 200 milliliters of N/2-hydrochloric acid, whereby the pH of the solution is reduced to 4.0 and white precipitates are produced. The white precipitates are collected and subjected to antimony analysis (content of antimony:83.0%) and X-ray diffraction to find the compound antimony trioxide. (yield 98%).

Reference 2.—A similar procedure to that in Reference 1 is conducted except that 113 milliliters of 0.94 N acetic acid is employed in place of the hydrochloric acid, whereby the obtained solution shows pH value of 6.0. The resulting white precipitates are dried to give 4.9 grams of antimony trioxide. (yield 96%)

Reference 3.—In 100 milliliters of water is dissolved 2.0 grams of antimony aminoalkoxide, which is prepared in Example 1, and the mixture is heated at 100° C. for 10 hours.

The resulting white solid is found by antimony analysis to contain 79.3% by weight of antimony and also found to contain antimony trioxide by X-ray diffraction and to have hydroxyl groups and have no organic group by infrared absorption spectrum. From those data, the white solid is found to be a mixture of antimony trioxide and antimony hydroxide.

Reference 4.—On the surface of 100 cm.$^2$ of glass plate is coated 1.5 grams of the antimony aminoalkoxide which is prepared in Example 1 to make a liquid layer of the antimony aminoalkoxide. The liquid layer is allowed to contact with a mixture of steam and vapourized acetic acid to form a film. The film is found by X-ray diffraction to be antimony trioxide.

Reference 5.—Four grams of the antimony aminoalkoxide prepared in Example 3, is dissolved in 20 milliliters of isopropanol. The solution is coated on the surface of 30 cm.$^2$ of steel plate and dried at room temperature. The plate treated above is allowed to contact with vapour of formic acid containing steam to form film. The film is found by X-ray diffraction to be antimony trioxide.

Practical application of the antimony aminoalkoxide

Reference 6.—Twenty grams of the antimony aminoalkoxide which is prepared by a similar procedure to that in Example 3 is admixed homogeneously with 20 grams of chlorinated paraffin containing 52% by weight of chlorine. The mixture is coated on a sample substrate. The substrate treated above is subjected to a flammability test and the result is shown in the following Table 1.

The test is conducted according to a test method described in Japanese Industrial Standard (JIS) L 1004–1959 5.21 (1959). Synthetic textile which is vigorously fused on heating or shaped like thread or cotton is subjected to the test by holding it with pincette over a Bunsen burner.

Please remark that the same flammability test as above is employed in all the references which will be hereinafter described.

TABLE 1

| Sample | Amount of sample employed (g.) | Amount of the composition coated (g.) | Fire flammability | | |
|---|---|---|---|---|---|
| | | | Treated with the present composition | Treated only with chlorinated paraffin | Non-treated sample |
| Cotton canvas (490 g./M$^2$.) | 3.05 | 2.38 | Self-extinguishing | Burning | Burning. |
| Vinylon canvas (400 g./M$^2$.) | 3.75 | 2.15 | do | do | Do. |
| Filter paper (119 g./M$^2$.) | 0.60 | 0.75 | do | do | Do. |

Reference 7.—The following ingredients are mixed in a high speed mixer to prepare an emulsion containing 6.3% by weight of antimony.

Parts by weight
Antimony aminoalkoxide (prepared in Example 3) __ 50
Chlorinated paraffin (chlorine content: 52%) _____ 29
Oleic acid _____ 4
Concentrated aqueous ammonia _____ 1
4% aqueous solution of methyl cellulose _____ 4
Petroleum ether _____ 4
Water _____ 50

The emulsion prepared above is coated on a sample and dried at 105° C. for 1 hour. The sample treated above is subjected to a flammability test and the result is shown in the following Table 2.

TABLE 2

| Sample | Amount of sample employed (g.) | Amount of the present composition coated (g.) | Fire flammability | |
|---|---|---|---|---|
| | | | Sample treated with the present composition | Non-treated sample |
| Cotton canvas (490 g./m$^2$.) | 3.05 | 4.76 | Self-extinguishing | Burning. |
| Vinylon canvas (400 g./m$^2$.) | 3.75 | 5.10 | do | Do. |
| Nylon canvas (115 g./m$^2$.) | 0.85 | 1.72 | do | Do. |
| Filter paper (119 g./m$^2$.) | 0.60 | 1.43 | do | Do. |

Reference 8.—The emulsion as prepared in Reference 7 is coated on a sample and dried. The sample treated above is subjected to contact with vapourized acetic acid saturated in a desiccator at 50° C. for 3 days, whereupon the sample retains its original and specific touch feeling.

The sample treated above is subjected to the flammability test and the result is shown in the following Table 3.

TABLE 3

| Sample | Amount of sample employed (g) | Sample treated with the present composition | Non-treated sample |
|---|---|---|---|
| Cotton canvas (490 g./m.²) | 3.05 | Self-extinguishing. | Burning. |
| Vinylon canvas (400 g./m.²) | 3.75 | ----do---------- | Do. |
| Nylon canvas (115 g./m.²) | 0.85 | ----do---------- | Do. |
| Filter paper (119 g./m.²) | 0.60 | ----do---------- | Do. |

Reference 9.—In 500 milliliters of water is dissolved 27.8 grams of antimony aminoalkoxide as prepared in Example 3. Saran filter is sufficiently immersed in the solution, followed by addition of 1 N-acetic acid solution until it becomes cloudy. The Saran filter treated above is dried in the air, whereupon it retains substantially its original and specific touch feeling.

The Saran filter treated above is subjected to the flammability test and the result is shown in the following Table 4.

TABLE 4

| Sample | Amount of sample employed (g.) | Sample treated with the present composition | Non-treated sample |
|---|---|---|---|
| Saran filter (280 g./m.²) | 2.15 | Non-ignition | Ignition. |

Reference 10.—In 500 milliliters of water are dissolved 27.8 grams of the antimony aminoalkoxide as prepared in Example 3 and 8.42 grams of Acetamine-24 (a commercial cation surfactant made by Kao Soap Company, Japan). The solution is coated on sample in a similar manner to that in Reference 9. Sample treated above is subjected to the flammability test and the result is shown in the following Table 5.

TABLE 5

| Sample | Amount of sample employed (g.) | Sample treated with the present composition | Non-treated sample |
|---|---|---|---|
| Kanekalon cotton ¹ | 2.0 | Non-ignition | Ignition. |
| Tevilon cotton ² | 2.0 | ----do---------- | Do. |

¹ Made by Kanegafuchi Chemical Industry Co. Ltd., Japan.
² Made by Teijin Ltd., Japan.

Reference 11.—Two hundred grams of the emulsion is prepared in Reference 7 is admixed with 100 grams of Croslene SA-20 (commercial SBR-latex containing 40% of solid which is made by Takeda Chemical Industries, Ltd., Japan), 0.6 gram of Sumitex Resin M-3 (Commercial melamine resin containing 80% of solid which is made by Sumitomo Chemical Co., Ltd.) and 35 grams of water. Immediately after mixing, Tetron random web of 50 g. per m.² is immersed in the mixture, taken up and softly pressed. The random web is pre-cured at 100° C. for 10 minutes and thoroughly cured at 150° C. for 5 minutes, whereupon 50 g./m.² (solid content) of latex is bound to the random web. The random web treated above does not take fire even when closely faced to flame.

Reference 12.—Five grams each of a homogeneous mixture of 10 grams of the antimony aminoalkoxide as prepared in Example 1 and 5 grams of tris(2,3-dibromopropyl)phosphate is coated on a sample. The sample treated above is subjected to the flammability test and the result is shown in the following Table 6.

TABLE 6

| Sample | Amount of sample employed (g.) | Sample treated with the present composition | Non-treated sample |
|---|---|---|---|
| Cotton canvas (490 g./m.²) | 3.05 | Self-extinguishing | Burning. |
| Vinylon canvas (400 g./m.²) | 3.75 | ----do---------- | Do. |
| Polypropylene filter (640 g./m.²) | 4.9 | ----do---------- | Do. |

Reference 13.—In 200 milliliters of acetone are dissolved 10 grams of the antimony aminoalkoxide and 10 grams of chlorinated paraffin (content of the chlorine: 70%). Sample is immersed in the solution, taken up, pressed softly and dried in the air. The sample prepared above is subjected to the flammability test and the result is shown in the following Table 7.

| Sample | Amount of sample employed (g.) | Sample treated with the present composition | Non-treated sample |
|---|---|---|---|
| Cotton canvas (490 g./m.²) | 1.5 | Self-extinguishing | Burning. |
| Woolen yarn (0.25 g./m.) | 2.0 | ----do---------- | Do. |
| Cashmilon yarn (0.24 g./m.) ¹ | 2.0 | ----do---------- | Do. |
| Polypropylene cotton ² | 2.0 | ----do---------- | Do. |
| Exlan cotton ³ | 2.0 | ----do---------- | Do. |

¹ Made by Asahi Chemical Industry Co., Ltd., Japan.
² Made by Daiwa Spinning Co., Ltd., Japan.
³ Made by Japan Exlan Co., Ltd., Japan.

Reference 14.—1.7 grams of the antimony aminoalkoxide as prepared in Example 1 is coated on a sample. The sample coated above is subjected to contact with vopourized glacial acetic acid in a desiccator at 50° C. for 3 days. The sample treated above is subjected to the flammability test and the result is shown in the following Table 8.

TABLE 8

| Sample | Amount of sample employed (g.) | Sample treated with the present composition | Non-treated sample |
|---|---|---|---|
| Saran filter | 2.15 | Non-ignition | Ignition. |

What is claimed:
1. An antimony aminoalkoxide compound selected from compounds of the formula:

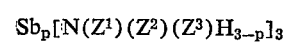

or compounds of the formula:

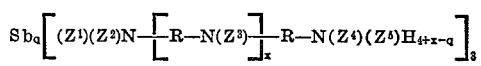

wherein $Z^1$, $Z^2$, $Z^3$, $Z^4$ and $Z^5$ are the same or different and each represents a straight-chained alkylene-oxy having up to 4 carbons, which may be branched with a methyl, ethyl, chloromethyl, allyloxy, phenyl or tolyl, R is a bivalent hydrocarbon having up to 14 carbons, x is an integer of from 0 to 7 inclusive, p is a whole number greater than 0 but less than 3, and g is also a whole number greater than 0 but less than 3.

2. An antimony aminoalkoxide compound as claimed in claim 1 selected from compounds of the formula:

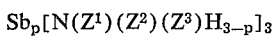

wherein $Z^1$, $Z^2$, $Z^3$ and $p$ are as defined in claim 1.

3. An antimony aminoalkoxide compound as claimed in claim 1 selected from compounds of the formula:

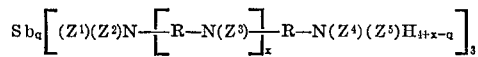

wherein $Z^1$, $Z^2$, $Z^3$, $Z^4$, $Z^5$, R, $x$ and $q$ are as defined in claim 1.

References Cited

UNITED STATES PATENTS

| | | | |
|---|---|---|---|
| 2,993,924 | 7/1961 | Marks et al. | 260—446 |
| 3,109,853 | 11/1963 | Worsley et al. | 260—446 |
| 3,158,637 | 11/1964 | Marks et al. | 260—446 |

WERTEN F. W. BELLAMY, Primary Examiner

U.S. Cl. X.R.

252—8.1; 117—136, 62